United States Patent
Riedl et al.

(10) Patent No.: US 12,518,124 B2
(45) Date of Patent: Jan. 6, 2026

(54) CARD-SHAPED DATA CARRIER COMPRISING WOOD

(71) Applicant: GIESECKE+DEVRIENT EPAYMENTS GMBH, Munich (DE)

(72) Inventors: Josef Riedl, Attenkirchen (DE); Thomas Tarantino, Laufen (DE); Peter Tarantino, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 0 days.

(21) Appl. No.: 18/701,370

(22) PCT Filed: Oct. 20, 2022

(86) PCT No.: PCT/EP2022/025479
§ 371 (c)(1),
(2) Date: Apr. 15, 2024

(87) PCT Pub. No.: WO2023/066525
PCT Pub. Date: Apr. 27, 2023

(65) Prior Publication Data
US 2025/0245468 A1     Jul. 31, 2025

(30) Foreign Application Priority Data
Oct. 21, 2021   (DE) ..................... 10 2021 005 252.8

(51) Int. Cl.
*G06K 19/06*   (2006.01)
*G06K 19/077*  (2006.01)

(52) U.S. Cl.
CPC ................. *G06K 19/0772* (2013.01)

(58) Field of Classification Search
CPC ......... G06K 19/07722; G06K 19/0723; G06K 19/07749; G06K 19/0772
(Continued)

(56) References Cited

U.S. PATENT DOCUMENTS

| 11,755,873 | B1 * | 9/2023 | Finn ................. G06K 19/07749 235/492 |
| 2016/0307088 | A1 * | 10/2016 | Wurmfeld ........ G06K 19/07722 |
| 2018/0178137 | A1 * | 6/2018 | Clark ..................... A63H 33/16 |

FOREIGN PATENT DOCUMENTS

| DE | 19519902 A1 | 12/1996 |
| DE | 10342054 A1 | 4/2005 |
| EP | 3499424 A1 | 6/2019 |

OTHER PUBLICATIONS

Stocker, Horst, "Taschenbuch der Physik" (English: "Paperback of Physics"), Jun. 19, 2003, pp. 224-225, ISBN 9783817116270.
(Continued)

*Primary Examiner* — Daniel St Cyr
(74) *Attorney, Agent, or Firm* — Workman Nydegger

(57) ABSTRACT

A card-shaped data carrier includes an electronic chip module having at least one chip and a contact structure; and a card body having an arrangement region for receiving the chip module. The chip module is arranged in the arrangement region of the card body. The card-shaped data carrier has at least a first wood layer and at least a second wood layer. The card-shaped data carrier can be bent out of a rest position into a bent position by the application of an external force; at least one restoring element for increasing the restoring force of the card-shaped data carrier is arranged between the first wood layer and the second wood layer. The restoring element is designed such that the card-shaped data carrier can be automatically returned from the bent position to the rest position when the external force is no longer applied.

12 Claims, 2 Drawing Sheets

(58) Field of Classification Search
USPC .................................................. 235/492, 487
See application file for complete search history.

(56) References Cited

OTHER PUBLICATIONS

Wikipedia, "Elastizitatsmodul" (English: "Modulus of elasticity"), Nov. 27, 2018, 10 pages. Retrieved from https://de.wikipedia.org/w/index.php?title=Elastizitatsmodul&oldid=183140822.
German Search Report from corresponding German Patent Application No. DE102021005252.8, Apr. 27, 2022.
International Search Report from corresponding PCT Application No. PCT/EP2022/025479, Feb. 14, 2023.

\* cited by examiner

CARD-SHAPED DATA CARRIER
COMPRISING WOOD

BACKGROUND

The present invention relates to a card-shaped data carrier, in particular a smartcard, which comprises wood.

A multiplicity of card-shaped data carriers are known from the prior art, for example smartcards, chip cards, dual-interface cards, integrated-circuit cards or identification cards.

For the production of card-shaped data carriers, it is furthermore known to use various components for contact-based and/or contactless data transmission, for example a chip module with a chip and a contact structure, a card body in which the chip module is arranged, and/or further components, for example an antenna or a capacitor for contactless data transmission.

It is known that such data carriers, or cards in general, are produced from thermoplastic materials such as polyvinyl chloride (PVC) and polyethylene terephthalate (PET). In recent years, however, increasing environmental awareness has drawn attention to the use of biologically degradable and environmentally friendly materials. In particular, it is known to provide card-shaped data carriers with a wood layer, for example as an overlay or cover layer. However, card-shaped data carriers that have for example a wood layer have a large anisotropy because of the wood fibers. In addition, although the card-shaped data carrier may be flexible because of the fiber structure of the wood, a bent card-shaped data carrier usually remains in the bent position and needs to be bent back manually. This represents manual effort for the user of the card-shaped data carrier. Convenient and reliable use of the card-shaped data carrier may also be negatively compromised because of possible permanent (bending) deformations and damage resulting therefrom.

SUMMARY

It is therefore an object of the present invention to provide a card-shaped data carrier, in particular a smartcard, with which reliable and convenient use can be provided.

According to one aspect of the invention, a card-shaped data carrier, in particular a smartcard, is provided, which comprises the following components: an electronic chip module with at least one chip and a contact structure, and a card body with an arrangement region for receiving the chip module. The chip module is arranged in the arrangement region of the card body. The card-shaped data carrier further has at least one first wood layer and at least one second wood layer, and the card-shaped data carrier can be bent from a neutral position by an external action of force into a bent position. At least one restoring element for increasing the restoring force of the card-shaped data carrier is arranged between the first wood layer and the second wood layer, the restoring element being configured in such a way that the card-shaped data carrier can be restored automatically, in particular elastically, from the bent position into the neutral position when the external action of force is relaxed.

In the context of the application, the chip module comprises at least one chip and a contact structure. Contact-based data transmission can therefore be established between the smartcard and a reader. In particular, the chip is in this case preferentially connected to contacts of the contact structure by means of wires. The contacts may be defined in their number, size and position by international standards so that the functions of the smartcard can be ensured in any reader. Further components may however be provided for the chip module, for example a capacitor or an antenna (as a coil) for capacitive or inductive contactless data transmission. A contactless smartcard may communicate with a reader by electromagnetic waves, in which case the smartcard may function in a similar way to a transmission and reception device. In particular, electromagnetic waves emitted by the reader generate an oscillating electromagnetic field which, for example, generates an oscillating electrical voltage in the coil or antenna of the chip module so that the chip can be supplied with power. The oscillations of the voltage may be detected as a signal and converted into data in the chip. These data may in turn be processed in the chip and converted into variations of the electromagnetic field, which may in turn be detected by the reader and converted into data. Overall, the chip module may therefore allow contact-based and/or contactless data transmission.

Preferentially, in the context of the application, the arrangement region is formed by a recess in the card body, in which the chip module is received, or the arrangement region for receiving the chip module is formed by a functional module, in particular on the surface of the card body, into which the chip module is integrated. In particular, the card body may be formed by a plurality of layers, a recess being provided in the layers in order to receive the chip module therein. This has the advantage of a protected and space-saving arrangement of the chip module inside the card body of the card-shaped data carrier.

Further, in the context of the application the neutral position of the card-shaped data carrier refers to a position in which substantially no external action of force is exerted on the card-shaped data carrier. If an external force acts on the card-shaped data carrier, this external action of force may cause deformation of the card-shaped data carrier. An external action of force in the context of the application may, for example, mean bending of the card-shaped data carrier by the hand of a user or deformation of the card-shaped data carrier inside an ATM or a wallet. Further external actions of force may be envisioned, for example impacts or pressure on the card-shaped data carrier. Therefore, the neutral position may for example constitute the position in which the card body of the card-shaped data carrier forms a substantially exact flat surface and has almost no deformation. The bent position of the card-shaped data carrier describes in particular a deformation of the card-shaped data carrier that occurs, for example deflection or twisting or bending. For example, this may include the possibility that the card body, or the card-shaped data carrier, is bent by the hand of the user out of the flat plane and the flat plane of the card body is at least partially angled off. In other words, the bent position may constitute a deformation of the card body of the card-shaped data carrier. Expressed another way, the external action of force causes a transition from the neutral position into the bent position.

In the context of the application, a restoring element for increasing the restoring force of the card-shaped data carrier is provided. The restoring force describes, for example, a force which may oppose the external action of force. In particular, the restoring force describes a force which can bring the card-shaped data carrier back from the bent position into the neutral position when the external action of force is relaxed. The card-shaped data carrier can be restored automatically, in particular elastically, from the bent position into the neutral position when the external action of force is relaxed. In other words, the card-shaped data carrier can be brought automatically back into the neutral position. This means in particular that the card-shaped data carrier can be deformed up to a certain extent because of the restoring element before returning elastically into the neutral position without permanent deformation. In particular, the card-shaped data carrier can be elastically deformed because of the restoring element, since the card-shaped data carrier can resume its original shape in the neutral position by itself.

The invention has the advantage that both mechanical stabilization, or strengthening, of the card-shaped data carrier and automatic restoring into the neutral position can be provided because of the restoring element. The elastic restoring into the neutral position can likewise ensure that electronic components, for example the chip module, do not experience any permanent plastic deformation and therefore damage because of an external action of force. Consequently, reliable and convenient use of the card-shaped data carrier can be provided.

Preferably, the restoring element may have a modulus of elasticity in the range of at least 100 kN/mm$^2$ and at most 500 kN/mm$^2$, in particular 200 kN/mm$^2$ and/or a strength of at least 1100 N/mm$^2$ and at most 1800 N/mm$^2$, in particular between 1400 N/mm$^2$ and 1700 N/mm$^2$. The modulus of elasticity is a value known from materials technology, and describes the proportional relationship between stress and strain during the deformation of a body, in particular the restoring element. The strength is likewise a value known from materials technology, and describes the loadability by mechanical loads before unacceptable deformation occurs, in particular a plastic deformation or a fracture. The strength refers in particular to a mechanical stress that a body, in particular the restoring element, can withstand during a deformation. For the strength, a distinction may for example be made between a tensile, compressive, bending or shear strength. Advantageously, a type of elastic limit may in this case be described by means of the modulus of elasticity and/or the strength, which constitutes the maximum mechanical stress due to an external action of force below which the restoring element is elastic, and in particular can independently resume the neutral position or the original shape, when the external action of force is relaxed. In other words, this may represent a type of reversible deformation. If the elastic limit is exceeded, a plastic deformation occurs, in particular an irreversible plastic deformation, for example a fracture. Since the values of the strength and/or modulus of elasticity are very high, mechanical stability of the card-shaped data carrier as well as elastic deformation can be guaranteed up to a high mechanical stress. This improves the mechanical properties of the card-shaped data carrier overall.

Preferably, the restoring element may be formed from spring steel. Spring steel may, for example, have a modulus of elasticity of about 206 kN/mm$^2$ and a strength of between 1400 N/mm$^2$ and 1700 N/mm$^2$. In comparison with normal construction steel, spring steel has a higher strength. The use of spring steel as a material for the restoring element has the advantage that spring steel has optimal mechanical properties in relation to deformability and strength, together with toughness. The restoring element may therefore be configured to be on the one hand mechanically stable and on the other hand elastic. Because of the very high strength, the restoring element made of spring steel can be bent very far before it breaks or changes its shape permanently, or plastically.

Advantageously, the restoring element may be configured in the form of a strip, the restoring element being arranged in a longitudinal or transverse direction with respect to the lengthwise axis of the card body. The strip-shaped configuration of the restoring element represents a space-saving arrangement inside the card body. Since card-shaped data carriers preferentially have a rectangular card body, the lengthwise axis of the card body extends in a centered fashion in the lengthwise direction in the plane of the card body. The restoring element may in this case preferentially be arranged in a longitudinal direction with respect to the lengthwise axis, in other words parallel to the lengthwise axis, between the first wood layer and the second wood layer. In particular, the restoring element may be arranged in a centered fashion along the lengthwise axis of the card body. Alternatively, the restoring element may be arranged in a transverse direction with respect to the lengthwise axis, in other words transversely with respect to the lengthwise axis, between the first wood layer and the second wood layer. In particular, the restoring element may in this case be arranged in a centered fashion transversely with respect to the lengthwise axis of the card body. In general, any desired number of restoring elements may be arranged between the first wood layer and the second wood layer. Preferably, two or four restoring elements may be provided. The restoring elements may, for example, be arranged in a centered fashion or off-center between the first wood layer or the second wood layer. Arranging the restoring element or restoring elements between the first and second wood layers has the advantage that the restoring element is kept protected as a mechanical reinforcement and is arranged centrally in the card body for mechanical stabilization.

In particular, the first, preferentially rectangularly configured, wood layer has a surface and an (opposite) lower face. Similarly, the second, preferentially rectangularly configured, wood layer has a surface and a lower face. The lower face of the first wood layer is preferentially arranged facing toward the surface of the second wood layer. Each wood layer may furthermore have a right side edge and a left side edge, as well as an upper lengthwise edge and a lower lengthwise edge. The restoring element or restoring elements may preferentially be arranged for arrangement between the two wood layers on the lower face of the first wood layer. Alternatively or in addition, it is conceivable for the restoring element or restoring elements to be arranged on the surface of the second wood layer. Overall, this has the advantage that the restoring element or restoring elements may be arranged flexibly between the two wood layers. Preferentially, the restoring element or restoring elements may be arranged in the vicinity of the side edges or of the lengthwise edges.

Preferably, the restoring element may be arranged homogeneously between the first wood layer and the second wood layer. For example, this may be achieved by arranging four restoring elements which are arranged in the vicinity of the side edges and lengthwise edges of the first wood layer. A restoring element may in this case respectively be arranged along a respective edge, that is to say the right and left side edge and the upper and lower lengthwise edge, of the first wood layer. Alternatively, it may also be achieved by a restoring element which is arranged centrally and longitudinally with respect to the lengthwise axis of the card body. Homogeneous distribution of the restoring element has the advantage that an external action of force on the card body, or the card-shaped data carrier, may be distributed uniformly.

In one particularly preferred embodiment, a core layer may be arranged between the first wood layer and the second wood layer, the restoring element being arranged on the core layer. The use of a core layer has the advantage that any desired number of further electronic components of the card-shaped data carrier may be arranged while being kept protected in the core layer. In a similar way to the wood layers, the core layer has a surface and a lower face. In particular, the surface of the core layer faces toward the lower face of the first wood layer, and correspondingly the lower face of the core layer faces toward the surface of the second wood layer. The restoring element may, for example, be arranged on the surface or on the lower face of the core layer. In particular, it is also possible for one restoring element to be arranged on the surface and for a further restoring element to be arranged on the lower face of the core layer.

Preferably, the core layer may be formed from paper, nonwoven, fabric, wood or plastic. The core layer may likewise conceivably be formed from polyvinyl chloride, polyethylene terephthalate glycol copolymer or polylactides. The material of the core layer may therefore be selected flexibly according to the particular application.

It is likewise preferentially conceivable for the restoring element to be embedded into the core layer or arranged on a surface of the core layer. Embedding the restoring element into the core layer has the advantage of keeping the restoring element protected and stabilized inside the card body. Arrangement on a surface of the core layer may, as already disclosed, take place on the surface or the lower face of the core layer. Overall, any desired number of restoring elements may in this case be provided, which are both embedded into the core layer or else additionally arranged on the surface and/or lower face of the core layer. A large number of restoring elements may lead to a homogeneous and uniform distribution of the external action of force and therefore guarantee elastic deformation of the card-shaped data carrier. In particular, the risk of plastic permanent deformation and therefore damage of the card-shaped data carrier may therefore be reduced.

Preferentially, one restoring element may be arranged on a surface of the core layer and a further restoring element may be arranged on an opposite lower face of the core layer. The use of two restoring elements has, as already described, the advantage that it leads to a homogeneous and uniform distribution of the external action of force along the thickness of the card-shaped data carrier and elastic deformation of the card-shaped data carrier can therefore be guaranteed.

In one particularly preferred embodiment, the core layer may have at least one antenna for contactless data transmission. The antenna may preferentially be configured as a coil for inductive contactless data transmission, which is coupled with the chip of the chip module. For example, the antenna may be integrated into the core layer and therefore kept protected in the card body. The card-shaped data carrier may therefore advantageously be used as a dual-interface card or as a contactless smartcard. Further electronic components may generally be envisioned for the card-shaped data carrier, and these may for example be integrated into the core layer or arranged on the core layer.

Advantageously, two restoring elements, particularly configured in the form of strips, may be provided, each of which is arranged in a longitudinal or transverse direction with respect to the lengthwise axis of the card body. For example, two restoring elements configured in the form of strips may be arranged on the surface of the core layer. The restoring elements may both be arranged in a transverse direction with respect to the lengthwise axis of the card body, and in particular arranged in the region of the side edges of the core layer. In other words, one restoring element may be arranged on the right side and one restoring element may be arranged on the left side on the core layer, respectively in the vicinity of the right and left side edge. Alternatively, the restoring elements may both be arranged in a longitudinal direction with respect to the lengthwise axis of the card body, and in particular arranged in the region of the lengthwise edges of the core layer. In other words, one restoring element may be arranged on the upper side and one restoring element may be arranged on the lower side on the core layer, respectively in the vicinity of the upper and lower lengthwise edges.

Alternatively or in addition, two restoring elements, particularly configured in the form of strips, may be provided, which are arranged crosswise with respect to one another. The restoring elements may in this case be arranged on the surface of the core layer or alternatively, for example, on the surface of the second wood layer or the lower face of the first wood layer. In particular, the restoring elements are each arranged along the diagonals of the core layer or of the respective wood layer. Expressed another way, the restoring elements intersect in their profile. A crosswise arrangement of two restoring elements may preferentially be dependent on the presence of an antenna in the core layer.

Alternatively or in addition, four restoring elements, particularly configured in the form of strips, may be provided, two restoring elements being arranged in a longitudinal direction with respect to the lengthwise axis of the card body and two restoring elements being arranged in a transverse direction with respect to the lengthwise axis of the card body. For example, the four restoring elements configured in the form of strips may be arranged on the surface of the core layer. The restoring elements may in this case be arranged in the region of the side edges and the lengthwise edges of the core layer. In other words, a restoring element may respectively be arranged in the vicinity of the right and left side edges and in the vicinity of the upper and lower lengthwise edges. The restoring elements may therefore preferentially be arranged in the vicinity of the contour of the core layer.

BRIEF DESCRIPTION OF THE DRAWINGS

The present invention will be described below with reference to the appended figures by way of example in the context of exemplary embodiments. Individual features of the embodiments may of course be freely combined with one another, insofar as is technically expedient, without departing from the scope of the present invention. Elements with the same function and effect are provided with the same reference signs in the figures. In the figures below, schematically.

DETAILED DESCRIPTION OF VARIOUS EMBODIMENTS

Figure 1:
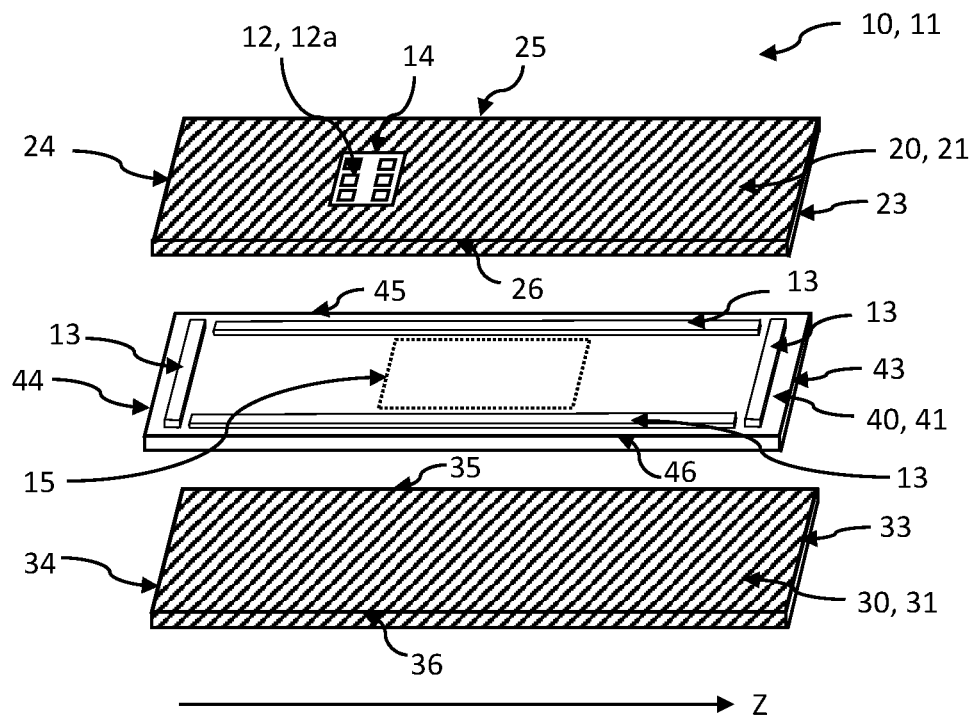
FIG. 1 shows a perspective exploded view of a card-shaped data carrier according to one exemplary embodiment of the invention.

FIG. 1 shows a perspective exploded view of a card-shaped data carrier 10 according to one exemplary embodiment of the invention. The card-shaped data carrier 10 is configured for example as a smartcard, in particular as a credit card, and comprises the following components.

The card-shaped data carrier 10 has a rectangular card body 11. In particular, the card body 11 of the card-shaped data carrier 10 has a layer structure. In other words, the card body 11 is formed from a plurality of individual layers, which are arranged stacked on one another. A first wood layer 20, a second wood layer 30 and a core layer 40 for the card body 11 are provided here. The core layer 40 is arranged in this case between the first wood layer 20 and the second wood layer 30. For example, the first wood layer 20 may form a wood veneer upper side of the smartcard and the second wood layer 30 may form a wood veneer lower side of the smartcard. The core layer 40 may for example be formed from paper, nonwoven, fabric, wood or plastic.

An electronic chip module 12 with at least one chip (not represented) and a contact structure 12a is further provided. Contact-based data transmission can therefore be established between the smartcard and a reader. Further components may however be provided for the chip module 12, for example a capacitor or an antenna (as a coil) for capacitive or inductive contactless data transmission. For example, the contact layer 40 may have an embedded antenna 15 which is coupled with the chip of the chip module 12. Overall, the chip module 12 may therefore allow contact-based and/or contactless data transmission.

The card body 11 of the card-shaped data carrier 10 has an arrangement region 14 for receiving the chip module 12, the chip module 12 being arranged in the arrangement region 14 of the card body 11. For example, the arrangement region 14 is formed by a recess in the card body 11, in which the chip module 12 is arranged and is therefore kept protected. In particular, the arrangement region 14 is formed by a recess in the first wood layer 20. In other words, the chip module 12 is arranged on a surface 21 of the first wood layer 20 inside the recess.

The first wood layer 20 further has the surface 21 and an (opposite) lower face (not represented). Similarly, the second wood layer 30 has a surface 31 and a lower face (not represented). Furthermore, the core layer 40 has a surface 41 and a lower face (not represented). Since the core layer 40 is arranged between the first wood layer 20 and the second wood layer 30, the surface 41 of the core layer 40 is arranged facing toward the lower face of the first wood layer 20. Similarly, the lower face of the core layer 40 is arranged facing toward the surface 31 of the second wood layer 30.

Furthermore, the first wood layer 20 has a right side edge 23 and a left side edge 24, as well as an upper lengthwise edge 25 and a lower lengthwise edge 26. In other words, the edges form a rectangular base shape. Similarly, the second wood layer 30 has a right side edge 33 and a left side edge 34, as well as an upper lengthwise edge 35 and a lower lengthwise edge 36. Likewise, the core layer 40 has a right side edge 43 and a left side edge 44, as well as an upper lengthwise edge 45 and a lower lengthwise edge 46. The lengthwise edges respectively extend parallel to the lengthwise axis Z of the card body 11. The side edges extend, in particular, transversely or perpendicularly with respect to the lengthwise axis Z of the card body 11.

Furthermore, the card-shaped data carrier 10 can be bent from a neutral position by an external action of force into a bent position. The card-shaped data carrier 10 is represented in FIG. 1 in the neutral position. The neutral position refers in particular to a position in which substantially no external action of force is exerted on the card-shaped data carrier 10. An external action of force, for example bending of the card-shaped data carrier 10 by means of the hand of a user, may cause deformation of the card-shaped data carrier 10. The bent position (not represented) may refer to a deformation of the card body 11 of the card-shaped data carrier 10. Expressed another way, the external action of force causes a transition from the neutral position into the bent position.

Furthermore, four restoring elements 13 for increasing the restoring force of the card-shaped data carrier 10 are arranged between the first wood layer 20 and the second wood layer 30, each restoring element 13 being configured in such a way that the card-shaped data carrier 10 can be restored automatically, in particular elastically, from the bent position into the neutral position when the external action of force is relaxed. The use of restoring elements 13 has the advantage that the card-shaped data carrier 10 can be deformed up to a certain extent before returning elastically into the neutral position without permanent deformation. Furthermore, the restoring elements 13 advantageously lead to mechanical stabilization, or strengthening, of the card-shaped data carrier 10.

For example, each restoring element 13 is formed from spring steel. Spring steel may, for example, have a modulus of elasticity of about 206 kN/mm$^2$ and a strength of between 1400 N/mm$^2$ and 1700 N/mm$^2$. Each restoring element 13 is, for example, configured in the form of a strip. The strip-shaped configuration represents a space-saving and compact arrangement inside the card-shaped data carrier 10. For example, two restoring elements 13 are arranged longitudinally (parallel) and two restoring elements 13 are arranged transversely (perpendicularly) with respect to the lengthwise axis Z of the card body 11. The restoring elements 13 are in this case arranged on the surface 41 of the core layer 40. The restoring elements 13 are arranged in the region of the side edges 43, 44 and the lengthwise edges 45, 46 of the core layer 40. In other words, a restoring element 13 may respectively be arranged in the vicinity of the right and left side edges 43, 44 and in the vicinity of the upper and lower lengthwise edges 45, 46. The restoring elements 13 may therefore preferentially be arranged in the vicinity of the contour of the core layer 40. In particular, the restoring elements 13 are distributed homogeneously between the first wood layer 20 and the second wood layer 30.

Figure 2:
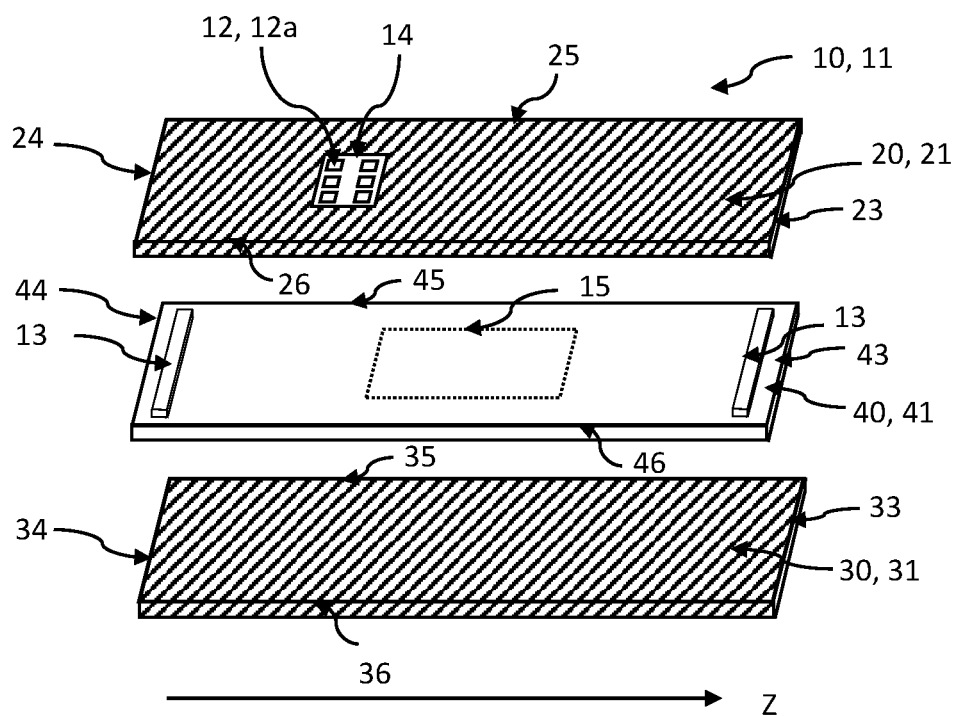
FIG. 2 shows a perspective exploded view of a card-shaped data carrier according to a further exemplary embodiment of the invention.

FIG. 2 shows a perspective exploded representation of a card-shaped data carrier 10 according to a further exemplary embodiment of the invention. The card-shaped data carrier 10 is configured in a similar way to FIG. 1. In contrast to FIG. 1, only two restoring elements 13 configured in the form of strips are provided in FIG. 2. The two restoring elements 13 are each arranged in a transverse direction with respect to the lengthwise axis Z of the card body 11. In particular, one restoring element 13 is arranged in the region of the right side edge 43 and one restoring element 13 is arranged in the region of the left side edge 44.

Figure 3:
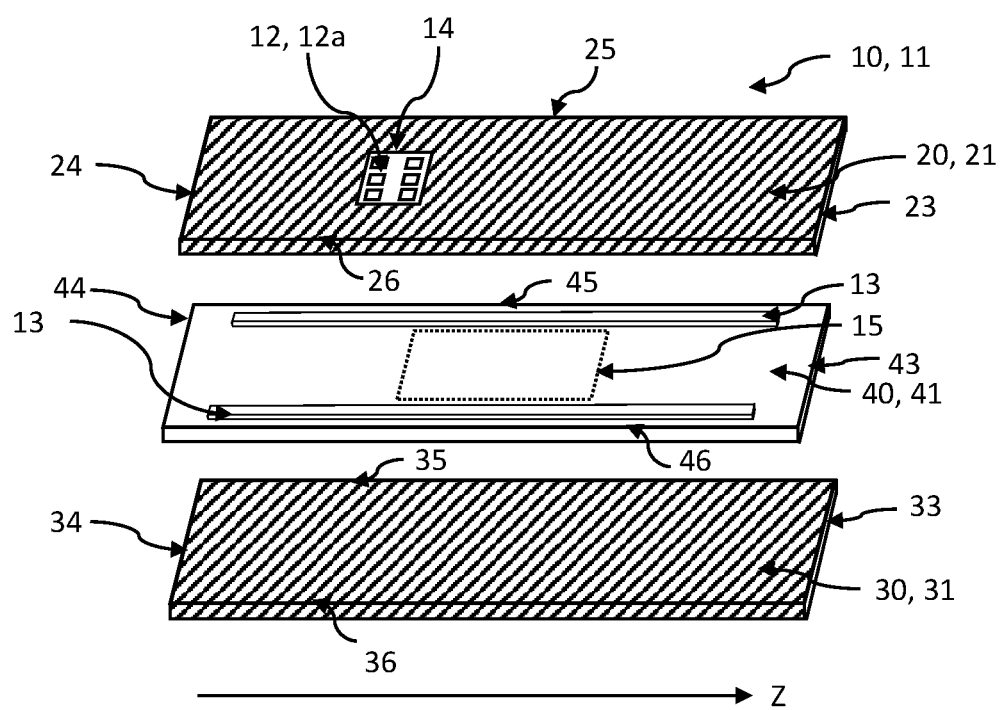
FIG. 3 shows a perspective exploded view of a card-shaped data carrier according to a third exemplary embodiment of the invention.

FIG. 3 shows a perspective exploded representation of a card-shaped data carrier 10 according to a third exemplary embodiment of the invention. The card-shaped data carrier 10 is configured in a similar way to FIG. 1. In contrast to FIG. 1, only two restoring elements 13 configured in the form of strips are provided in FIG. 3. The two restoring elements 13 are each arranged in a longitudinal direction with respect to the lengthwise axis Z of the card body 11. In particular, one restoring element 13 is arranged in the region of the upper lengthwise edge 45 and one restoring element 13 is arranged in the region of the lower lengthwise edge 46.

In general, the number of restoring elements 13 and their arrangement between the first wood layer 20 and the second wood layer 30 may be adapted flexibly according to the particular application.

The invention claimed is:

1. A card-shaped data carrier comprising an electronic chip module with at least one chip and a contact structure, and a card body with an arrangement region for receiving the chip module, wherein the chip module is arranged in the arrangement region of the card body, wherein the card-shaped data carrier has at least one first wood layer and at least one second wood layer, wherein the card-shaped data carrier can be bent from a neutral position by an external action of force into a bent position, wherein at least one restoring element for increasing the restoring force of the card-shaped data carrier is arranged between the first wood layer and the second wood layer, wherein the restoring element is configured in such a way that the card-shaped data carrier can be restored automatically from the bent position into the neutral position when the external action of force is relaxed, wherein a core layer is arranged between the first wood layer and the second wood layer, wherein the at least one restoring element comprises one restoring element arranged at a surface of the core layer and a further restoring element arranged at an opposite lower face of the core layer.

2. The card-shaped data carrier according to claim 1, wherein the restoring element has a modulus of elasticity in the range of at least 100 kN/mm2.

3. The card-shaped data carrier according to claim 1, wherein the restoring element is formed from spring steel.

4. The card-shaped data carrier according to claim 1, wherein the restoring element is configured in the form of a strip, the restoring element being arranged in a longitudinal or transverse direction with respect to the lengthwise axis of the card body.

5. The card-shaped data carrier according to claim 1, wherein the restoring element is arranged homogeneously between the first wood layer and the second wood layer.

6. The card-shaped data carrier according to claim 1, wherein the core layer is formed from paper, nonwoven, fabric, wood or plastic.

7. The card-shaped data carrier according to claim 1, wherein the restoring element is embedded into the core layer or is arranged on a surface of the core layer.

8. The card-shaped data carrier according to claim 1, wherein the core layer has at least one antenna for contactless data transmission.

9. The card-shaped data carrier according to claim 1, wherein two restoring elements, configured in the form of strips, are provided, each of which is arranged in a longitudinal or transverse direction with respect to the lengthwise axis of the card body.

10. The card-shaped data carrier according to claim 1, wherein two restoring elements, configured in the form of strips, are provided, which are arranged crosswise with respect to one another.

11. The card-shaped data carrier according to claim 1, wherein four restoring elements, configured in the form of strips, are provided, two restoring elements being arranged in a longitudinal direction with respect to the lengthwise axis of the card body and two restoring elements being arranged in a transverse direction with respect to the lengthwise axis of the card body.

12. The card-shaped data carrier according to claim 1, wherein the one restoring element arranged at the surface of the core layer has a different shape than the further restoring element arranged at the opposite lower face of the core layer.

* * * * *